US012725796B2

(12) United States Patent
Gong et al.

(10) Patent No.: US 12,725,796 B2
(45) Date of Patent: Sep. 1, 2026

(54) CATHODE ACTIVE MATERIAL FOR SODIUM-ION BATTERIES, AND PREPARATION METHOD THEREFORE AND APPLICATION THEREOF

(71) Applicant: Jiangsu Xiangying New Energy Technology CO., LTD., Changzhou City (CN)

(72) Inventors: Liming Gong, Changzhou City (CN); Huan Zhong, Changzhou City (CN); Jie Huang, Changzhou City (CN); Wen Jiang, Changzhou City (CN); Liang Chen, Changzhou City (CN)

(73) Assignee: Jiangsu Xiangying New Energy Technology CO., LTD., Changzhou City (CN)

( * ) Notice: Subject to any disclaimer, the term of this patent is extended or adjusted under 35 U.S.C. 154(b) by 512 days.

(21) Appl. No.: 18/277,660

(22) PCT Filed: Mar. 23, 2022

(86) PCT No.: PCT/CN2022/082410

§ 371 (c)(1),
(2) Date: Aug. 17, 2023

(87) PCT Pub. No.: WO2023/137859

PCT Pub. Date: Jul. 27, 2023

(65) Prior Publication Data

US 2024/0136516 A1 Apr. 25, 2024
US 2024/0234711 A9 Jul. 11, 2024

(30) Foreign Application Priority Data

Jan. 24, 2022 (CN) ......................... 202210079041.9

(51) Int. Cl.

| | |
|---|---|
| ***H01M 4/525*** | (2010.01) |
| ***C01G 53/50*** | (2025.01) |
| ***C01G 53/66*** | (2025.01) |
| ***H01M 4/505*** | (2010.01) |
| ***H01M 10/054*** | (2010.01) |
| *H01M 4/02* | (2006.01) |

(52) U.S. Cl.

CPC ............ *H01M 4/525* (2013.01); *C01G 53/50* (2013.01); *C01G 53/66* (2013.01); *H01M 4/505* (2013.01); *C01P 2002/52* (2013.01); *C01P 2004/61* (2013.01); *C01P 2006/11* (2013.01); *C01P 2006/12* (2013.01); *C01P 2006/40* (2013.01); *H01M 2004/021* (2013.01); *H01M 10/054* (2013.01)

(58) Field of Classification Search

None

See application file for complete search history.

(56) References Cited

U.S. PATENT DOCUMENTS

2018/0190990 A1 7/2018 Tarascon et al.

FOREIGN PATENT DOCUMENTS

| | | | |
|---|---|---|---|
| CN | 107093713 A * | 8/2017 | .......... H01M 10/054 |
| CN | 112310390 | 2/2021 | |
| CN | 113471431 | 10/2021 | |
| EP | 3415470 | 12/2018 | |

OTHER PUBLICATIONS

International Search Report and Written Opinion for PCT/CN2022/082410 dated Oct. 20, 2022.

* cited by examiner

*Primary Examiner* — Carlos Barcena

(74) *Attorney, Agent, or Firm* — Barnes & Thornburg LLP

(57) ABSTRACT

Disclosed are a cathode active material for sodium-ion batteries and a preparation method therefor and an application thereof. The cathode active material has a chemical formula of $Na_xNi_yFe_zMn_gM_hA_mO_2$, where M is selected from the group consisting of Ti, Al, Mg, Ca, Zr, Y, Zn, Nb, W and combinations thereof, A is selected from the group consisting of B, P, C and combinations thereof, $0.80 \le x \le 1.40$, $0.05 \le y \le 0.95$, $0.05 \le z \le 0.95$, $0.05 \le g \le 0.95$, $0.01 \le h \le 0.50$, and $0.01 \le m \le 0.30$. By adding M and A elements to the ternary iron-manganese-nickel cathode active material for sodium-ion batteries, and controlling the ratio of all elements, the present disclosure can achieve the formation of a perfect layered single-crystal structure of the cathode active material for sodium-ion batteries, with large particles, ultimately achieving the stability of the active material, and when used in sodium-ion batteries, it can significantly improve the cycling performance at high temperatures while ensuring high gram capacity.

19 Claims, 6 Drawing Sheets

CATHODE ACTIVE MATERIAL FOR SODIUM-ION BATTERIES, AND PREPARATION METHOD THEREFORE AND APPLICATION THEREOF

CROSS-REFERENCE TO RELATED APPLICATION

This application is U.S. national phase under 35 U.S.C. § 371 of International Patent Application No. PCT/CN2022/082410, filed on Mar. 23, 2022, which claims priority to Chinese Application No. 202210079041.9, filed on Jan. 24, 2022, the contents of all of which are incorporated by reference in their entirety.

TECHNICAL FIELD OF THE INVENTION

The present disclosure belongs to the field of sodium-ion batteries, and specifically relates to a cathode active material for sodium-ion batteries and a preparation method therefor and an application thereof.

BACKGROUND OF THE INVENTION

Lithium-ion batteries have been widely used in the fields of electric vehicles, medium and large energy storage power stations, electric two-wheelers, power tools, portable electronic devices and the like. However, with the explosive growth of use of lithium-ion batteries in electric vehicles and medium and large energy storage stations, the structural shortage of lithium resources has come to the fore, leading to a surge in the price of lithium salts and a surge in the cost of lithium-ion batteries. Sodium-ion batteries have similar electrochemical properties with lithium-ion batteries, and sodium-ion batteries are abundant in resources and have lower costs, so they have become a popular development direction in recent years and are expected to be widely used in the fields of electric two-wheelers and medium and large energy storage power stations.

Due to the large radius of sodium ions, the available cathode active materials for sodium-ion batteries are relatively limited, and at present, the cathode active materials for sodium-ion batteries that have shown potential application prospects include three types of systems: Prussian blue, layered oxides, and polyanions. Wherein the O3-structure layered oxide systems, similar to the ternary cathode active materials in lithium-ion batteries, have the advantages of high capacity and high compaction density, and are regarded as the most promising cathode materials, which are adopted by sodium-ion battery companies at home and abroad.

Chinese patent CN109817970A discloses a method of preparing a single-crystal electrode material for sodium-ion battery, which comprises mixing a mixed aqueous solution of a ferric salt, a manganese salt and an M salt, a precipitant, a complexing agent and a dispersant to react to give a solid, which is a precursor of battery electrode material; mixing the precursor and a sodium salt, sintering and cooling to give a single-crystal electrode material for sodium-ion battery; wherein the dispersant is ammonium polyacrylate. When the specific ammonium polyacrylate dispersant mentioned above is not used, the crystal morphology of the grains is not obvious, and micron-sized large single crystals cannot be formed, and the discharge capacity and capacity retention of the corresponding battery electrode materials are low.

The layered oxide cathode active materials show excellent electrochemical performance, but they have problems such as excessive structural phase transitions during charge and discharge processes, poor air storage performance, high surface alkalinity, and side reactions with electrolytes, which greatly restrict the large-scale commercial application of such active materials.

SUMMARY OF THE INVENTION

The purpose of the present disclosure is to provide, in response to the shortcomings and deficiencies of the prior art, a cathode active material for sodium-ion batteries, which can ensure the excellent gram capacity performance of sodium-ion batteries and improve cycling performance at high temperatures, while being able to form a stable single crystal structure with low surface alkalinity.

To solve the above technical problems, a technical solution employed by the present disclosure is as follows:

A cathode active material for sodium-ion batteries, of which the chemical formula is $Na_xNi_yFe_zMn_gM_hA_mO_2$, wherein M is selected from the group consisting of Ti, Al, Mg, Ca, Zr, Y, Zn, Nb, W and combinations thereof, A is selected from the group consisting of B, P, C and combinations thereof, $0.80 \leq x \leq 1.40$, $0.05 \leq y \leq 0.95$, $0.05 \leq z \leq 0.95$, $0.05 \leq g \leq 0.95$, $0.01 \leq h \leq 0.50$, and $0.01 \leq m \leq 0.30$.

According to some preferred and specific aspects of the present disclosure, in the chemical formula $Na_xNi_yFe_zMn_gM_hA_mO_2$, $0.90 \leq x \leq 1.20$, and $1.2-(y+z+g+h) \geq 0$.

According to some preferred and specific aspects of the present disclosure, in the chemical formula $Na_xNi_yFe_zMn_gM_hA_mO_2$, $0.95 \leq x \leq 1.05$, $0.1 \leq y \leq 0.5$, $0.1 \leq z \leq 0.6$, $0.1 \leq g \leq 0.5$, $0.01 \leq h \leq 0.3$, and $0.01 \leq m = 0.2$.

According to some preferred and specific aspects of the present disclosure, in the chemical formula $Na_xNi_yFe_zMn_gM_hA_mO_2$, $0.98 \leq x \leq 1.03$, $0.1 \leq y \leq 0.4$, $0.2 \leq z \leq 0.5$, $0.1 \leq g \leq 0.4$, $0.01 \leq h \leq 0.2$, and $0.01 \leq m \leq 0.1$.

In some specific implementations of the present disclosure, M is selected from the group consisting of Ti, Mg, Ca and combinations thereof, A is selected from combinations of two or three of B, P and C.

In some specific implementations of the present disclosure, A is combinations of three of B, P and C, and the molar ratio of B, P and C is (2-4):(0.1-1.5):(0.1-1.5).

In some specific implementations of the present disclosure, A is combinations of two of B and P, and the molar ratio of B and P is (2-4):(0.1-1.5).

In some specific implementations of the present disclosure, the cathode active material has a layered single-crystal structure, with an average particle size of 1-30 microns.

In some specific implementations of the present disclosure, the cathode active material has a tap density of 1.33-2.5 $g/cm^3$, and a pH of below 12.6.

The inventor found through research that adding M and A elements to the cathode active material for sodium-ion batteries, combined with the ratio of sodium, nickel, iron, manganese and M, A and O elements, can achieve the formation of a perfect layered single-crystal structure of the cathode active material for sodium ion batteries, the active material can form large particles and the particles grow densely, the active material has a significantly increased tap density, low pH, low surface alkalinity, stable surface properties, and minimal side reactions with electrolytes, and when used in sodium-ion batteries, it can significantly improve the cycling performance at high temperatures while ensuring high gram capacity.

In the cathode active material for sodium-ion batteries of the present disclosure, various elements play different roles, where Ni and Mn elements enable the sodium-ion battery to have a high gram capacity; Fe element has the dual effect of exerting its gram capacity and increasing the discharge voltage of the material; M element enhances the stability of the active material; B element promotes the formation of large single-crystal structure of the active material, improving the tap density of the material; P element can improve the cycling performance of the active material at high temperatures; in addition, various elements also have synergistic interactions and work together to achieve the excellent performance of the cathode active material for sodium-ion batteries of the present disclosure, and significant improvement of the cycling performance at high temperatures.

The present disclosure further provides a method for preparing the cathode active material for sodium-ion batteries mentioned above, the preparation method comprises the following steps:

1) reacting a nickel salt, a manganese salt, and a hydroxide in the presence of a complexing agent to form nickel-manganese hydroxide;
2) adding water to the nickel-manganese hydroxide, an iron source, a compound containing M element, a compound containing A element, and a sodium source to make a slurry, and sand grinding to give a mixed slurry;
3) drying and sintering the mixed slurry to give a cathode active material for sodium-ion batteries.

Further, the chemical formula of the nickel-manganese hydroxide in step 1) is $Ni_aMn_b(OH)_2$, where $0.05 \leq a \leq 0.95$, $0.05 \leq b \leq 0.95$, and $1-a-b \geq 0$.

Further, in step 1), the nickel salt is selected from the group consisting of nickel sulfate, nickel chloride, nickel nitrate and combinations thereof, the manganese salt is selected from the group consisting of manganese sulfate, manganese chloride, and manganese nitrate and combinations thereof, the hydroxide is selected from the group consisting of sodium hydroxide, potassium hydroxide and combinations thereof, and the complexing agent is selected from the group consisting of ethylenediamine, ethylenediamine tetraacetic acid, tartaric acid, citric acid, oxalic acid, ammonia and combinations thereof.

In some implementations of the present disclosure, in step 1), the nickel salt and the manganese salt are prepared into a metal salt solution, which is then mixed with an aqueous solution of the hydroxide and the complexing agent to obtain a mixed solution, and the mixed solution is then reacted at pH 9-12 and 40-70° C. and stirring to give the nickel-manganese hydroxide.

More preferably, the total concentration of nickel and manganese ions in the metal salt solution is 0.5-2 mol/L.

More preferably, the stirring speed is 500-1200 r/min, and $Ni_aMn_b(OH)_2$ is obtained by aging, washing, and drying after the reaction.

In some implementations of the present disclosure, in step 2), the iron source is selected from the group consisting of ferrous oxide, ferric oxide, ferroferric oxide and combinations thereof; the sodium source is selected from the group consisting of sodium carbonate, sodium hydroxide and combinations thereof.

In some implementations of the present disclosure, in step 2), the compound containing M element is selected from the group consisting of titanium dioxide, aluminum oxide, magnesium oxide, calcium oxide, calcium carbonate, zirconia, yttrium oxide, zinc oxide, niobium oxide, tungsten oxide and combinations thereof; the compound containing A element is selected from the group consisting of boric acid, boron oxide, sodium tetraborate, phosphorus pentoxide, phosphoric acid, sodium phosphate, sodium hypophosphite, glucose, sucrose, polyethylene glycol, polyvinyl alcohol and combinations thereof.

In some implementations of the present disclosure, in step 2), a ratio of the total molar amount of nickel and manganese in the nickel-manganese hydroxide, iron in the iron source, M element in the compound containing M element and A element in the compound containing A element to the molar amount of sodium in the sodium source is 1:(0.90-1.20).

In some implementations of the present disclosure, in step 2), the sand grinding time is 0.5-8 h, the grinding body is zirconia balls with particle sizes of 0.1-0.8 mm, and the sand grinding speed is 800-3000 rpm.

In some implementations of the present disclosure, the solid content of the mixed slurry is 10%-60%, and the median particle size of the particles in the mixed slurry is 20-800 nm.

In some implementations of the present disclosure, in step 3), the drying is spray drying, and in the spray drying equipment, the rotational speed of the atomizing disc is 1000-3000 rpm, the inlet air temperature is 150-300° C., and the outlet air temperature is 80-120° C.

In some implementations of the present disclosure, in step 3), the sintering is carried out in air, with a sintering temperature of 750-1000° C. and a sintering time of 5-25 h. Preferably, crushing is carried out after sintering.

In the preparation method of the present disclosure, for Ni and Mn elements that are easy to form uniform precipitation, the use of their hydroxides as raw materials can improve reaction activity, and for Fe and M elements that are not easy to form uniform precipitation, the use of their oxides or the compound containing M element as raw materials can ensure the stability of the corresponding element contents. Sand grinding after mixing the nickel-manganese hydroxide, the compound containing M element, the compound containing A element and the sodium source can ensure that various elements are fully mixed evenly, and the use of spray drying can ensure that a variety of raw materials will not have component segregation in the formation process.

The present disclosure further provides use of the cathode active material for sodium-ion batteries mentioned above in a cathode of a sodium-ion battery.

The present disclosure further provides a cathode material for sodium-ion batteries, which comprises a cathode active material, an adhesive and a conductive agent, the cathode active material comprising the cathode active material for sodium-ion batteries mentioned above.

The present disclosure further provides a cathode for sodium-ion batteries prepared by the cathode active material for sodium-ion batteries mentioned above.

The present disclosure further provides a sodium-ion battery, which comprises a cathode, and the cathode comprises the cathode for sodium-ion batteries mentioned above.

The present disclosure has the following technical advantages over the prior art:

The cathode active material for sodium-ion batteries of the present disclosure can form a perfect layered single-crystal structure, with large single-crystal particles and dense growth, the cathode active material has a significantly increased tap density, low pH, stable surface properties, and minimal side reactions with electrolytes, and when used in sodium-ion batteries, it can significantly improve the cycling performance at high temperatures while ensuring high gram capacity.

The preparation method of the present disclosure can produce excellent-performance cathode active material for sodium-ion batteries in large quantities and stably.

DETAILED DESCRIPTION OF EXEMPLARY EMBODIMENTS

Figure 1:
FIG. 1 is a scanning electron microscope image of $NaNi_{0.25}Fe_{0.4}Mn_{0.25}Ti_{0.05}B_{0.05}O_2$ prepared in Embodiment 1.
Figure 1:
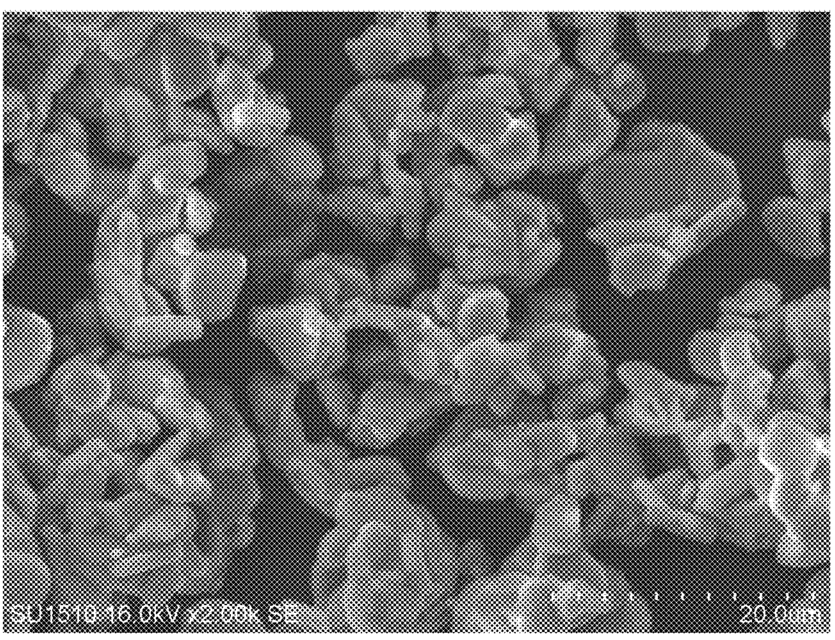

To better understand the present disclosure, it is further explained below combining with specific embodiments and the accompanying drawings. It should be understood that these embodiments are intended only for the further description of the present disclosure and are not intended to limit the scope of the present disclosure. Furthermore it should be understood that after reading the contents of the present disclosure, various improvements and adjustments made to the present disclosure by those skilled in the art, without departing from the principles of the present disclosure, still fall within the scope of protection of the present disclosure. In the following, all raw materials were obtained commercially if not otherwise specified.

In the following embodiments and comparative examples, the charge-discharge curves and high-temperature cycling performance were tested using the following method: first, preparing a sodium-ion battery: 20 g of prepared cathode active material was weighed, 0.64 g of conductive agent SP and 0.64 g of PVDF dissolved in NMP were added, mixed evenly, and coated on aluminum foil to make an electrode plate. In a glove box in argon atmosphere, a button cell was assembled with a metal sodium sheet as the anode, Celgard2700 as the diaphragm, and 1 mol/L $NaPF_6$+EC:DEC (1:1)+5% FEC as the electrolyte. Then, the charge-discharge curve was tested at a voltage range of 2.0-4.0 V, a charge discharge rate of 0.1 C, a current of 13 mA, and a test temperature of 25±2° C., and the cycling performance was tested for 100 cycles at a voltage range of 2.0-4.0 V, a charge discharge rate of 1 C, a current of 130 mA, and 60° C.

Embodiment 1

This embodiment provides a cathode active material for sodium-ion batteries, the chemical formula thereof is $NaNi_{0.25}Fe_{0.4}Mn_{0.25}Ti_{0.05}B_{0.05}O_2$, and the preparation method comprises the following steps:

(1) Nickel sulfate and manganese sulfate was added to pure water in a Ni:Mn molar ratio of 1:1 to prepare a solution with a total concentration of metallic elements of 1.3 mol/L;

(2) A 4.0 mol/L solution of sodium hydroxide and a 5.0 mol/L solution of ammonia were prepared;

(3) The metal salt solution obtained in step (1) and the sodium hydroxide solution and ammonia solution obtained in step (2) were added to a reactor at a rate of 2.5 L/h, 1.5 L/h, and 0.2 L/h, respectively, and a precursor was prepared by controlling the reaction temperature to 50° C., reaction pH to 11.5, stirring speed to 650 rpm, and reacting time to 12 h;

(4) The precursor was washed with pure water, filtered, and dried to give $Ni_{0.5}Mn_{0.5}(OH)_2$;

(5) 2.0 mol of $Ni_{0.5}Mn_{0.5}(OH)_2$, 0.8 mol of $Fe_2O_3$, 0.2 mol of $TiO_2$, 0.2 mol of $H_3BO_3$, 2.0 mol of $Na_2CO_3$ were added into 3.5 L of water to prepare a slurry;

(6) The slurry obtained in step (5) was added to a sand grinder, and ground for 3 h, with the grinding body being zirconia balls with a particle size of 0.2 mm, and a sand grinding speed of 2500 rpm, to give a mixed slurry with an average particle size of about 350 nm;

(7) The mixed slurry prepared in step (6) was transferred into a mixing drum, stirred thoroughly, and mixed with pure water to form a slurry with a solid content of 30±1%, spray dried under the conditions of spray drying equipment with an atomization frequency of 35 Hz, an inlet air temperature of 190° C. and an outlet air temperature of 85° C., the dried product was sintered at 850-940° C. for 12 h in an air-atmosphere furnace, cooled to below 80° C., jaw broken, rolled, and crushed to give a cathode active material for sodium-ion batteries, named as NFM242-TB.

Figure 2:
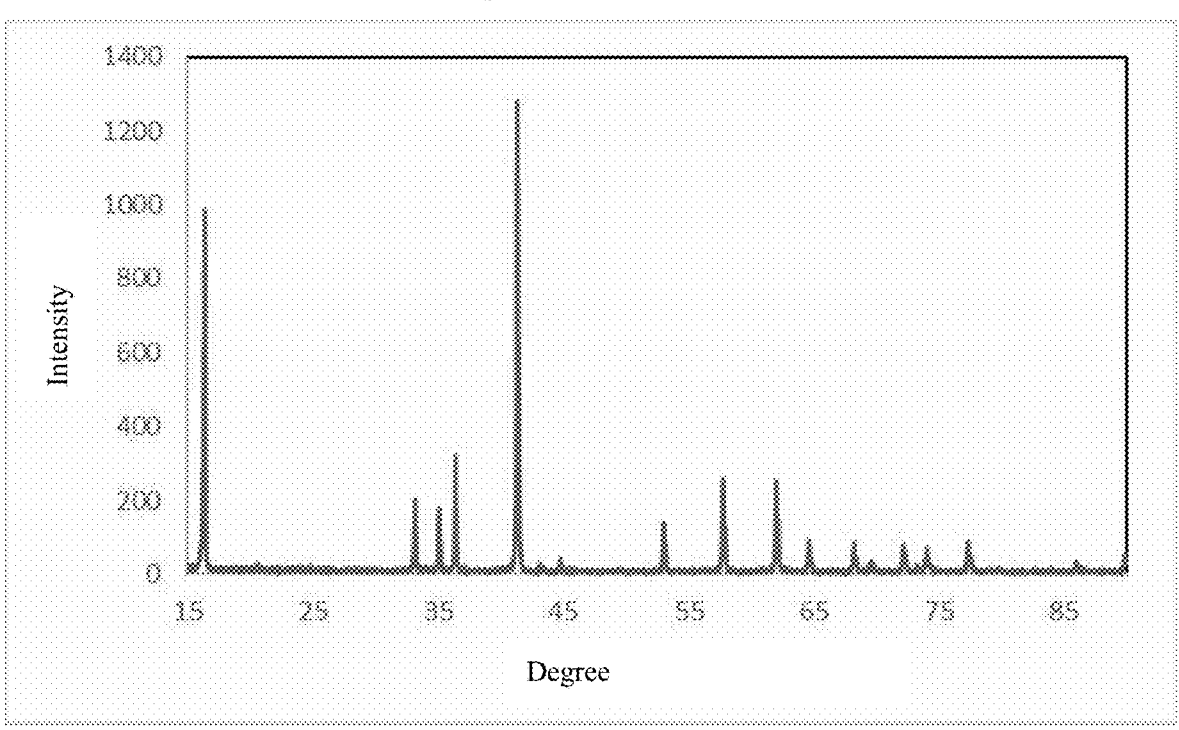
FIG. 2 is a XRD (X-Ray Diffraction) pattern of $NaNi_{0.25}Fe_{0.4}Mn_{0.25}Ti_{0.05}B_{0.05}O_2$ prepared in Embodiment 1.
Figure 3:
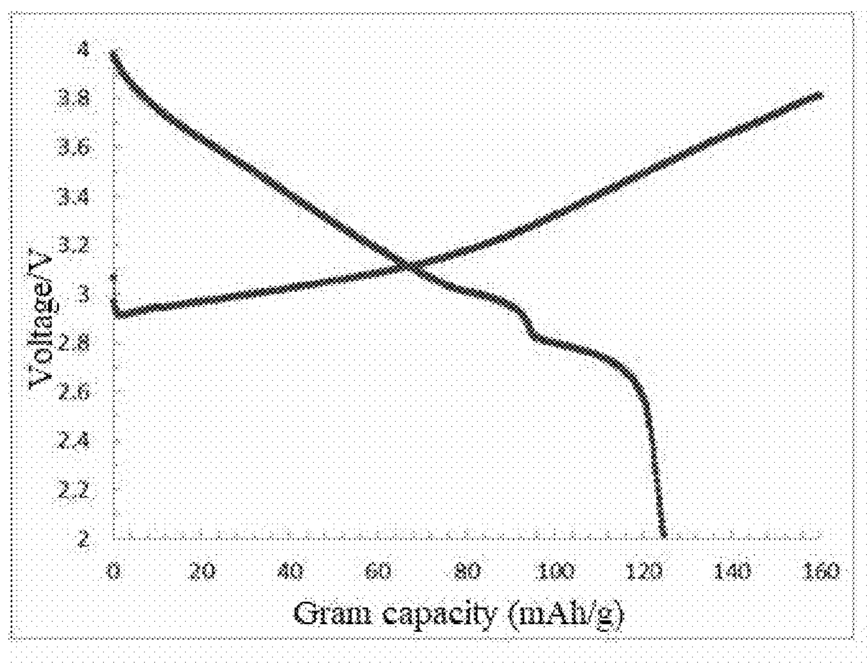
FIG. 3 is a charge-discharge curve of $NaNi_{0.25}Fe_{0.4}Mn_{0.25}Ti_{0.05}B_{0.05}O_2$ prepared in Embodiment 1.
Figure 4:
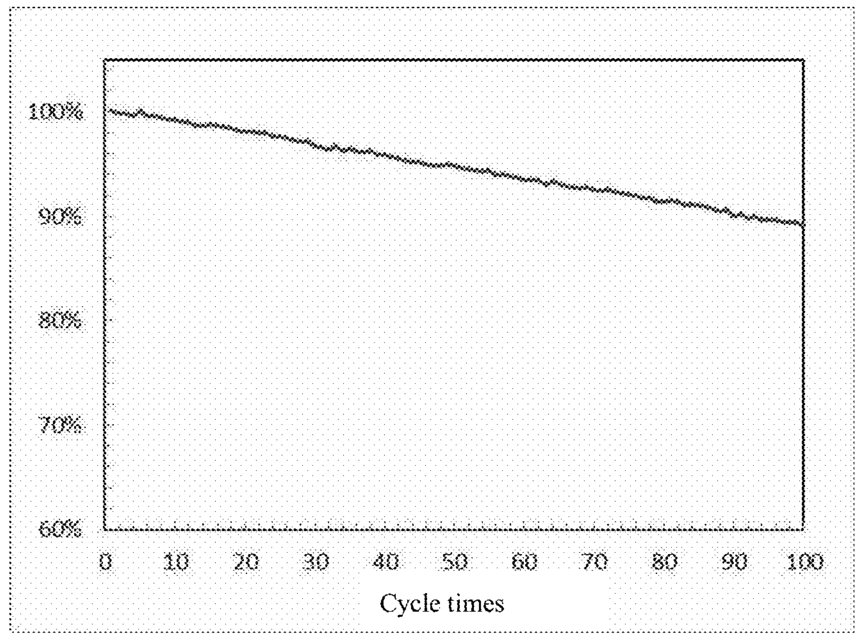
FIG. 4 is a high-temperature (60° C.) cycling diagram of $NaNi_{0.25}Fe_{0.4}Mn_{0.25}Ti_{0.05}B_{0.05}O_2$ prepared in Embodiment 1 at 2.0-4.0 V/1 C.

The scanning electron microscope image of NFM242-TB is shown in FIG. 1, and it can be seen that the material has a single crystal morphology. The XRD pattern of NFM242-TB is shown in FIG. 2, and it can be seen that the material is $\alpha$-$NaFeO_2$ type pure phase layered structure. The charge-discharge curve of NFM242-TB is shown in FIG. 3, and it can be seen that within the voltage window of 2.0-4.0 V, the discharge gram capacity at a rate of 0.1 C is 124.8 mAh/g. The high-temperature cycling diagram of NFM242-TB is shown in FIG. 4, and it can be seen that at 60° C., within the voltage window of 2.0-4.0 V, the capacity retention rate is 89.04% after 100 cycles at a rate of 1 C.

Embodiment 2

The chemical formula of the cathode active material for sodium-ion batteries of this embodiment is $NaNi_{0.25}Fe_{0.40}Mn_{0.25}Ti_{0.03}B_{0.05}P_{0.02}O_2$.

The preparation method was basically the same as that in Embodiment 1, except that step (5) was replaced by: 2.0 mol of $Ni_{0.5}Mn_{0.5}(OH)_2$, 0.8 mol of $Fe_2O_3$, 0.12 mol of $TiO_2$, 0.2 mol of $H_3BO_3$, 0.08 mol of $H_3PO_4$, 2.0 mol of $Na_3CO_3$ were added into 3.5 L of water to prepare a slurry. The sample was named NFM242-TBP.

Figure 5:
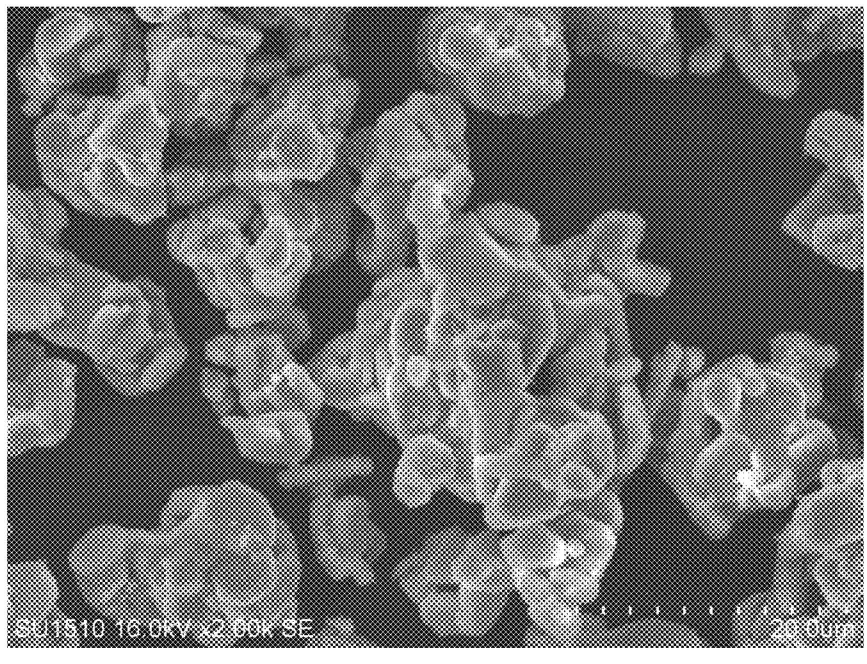
FIG. 5 is a scanning electron microscope image of $NaNi_{0.25}Fe_{0.40}Mn_{0.25}Ti_{0.03}B_{0.05}P_{0.02}O_2$ prepared in Embodiment 2.
Figure 6:
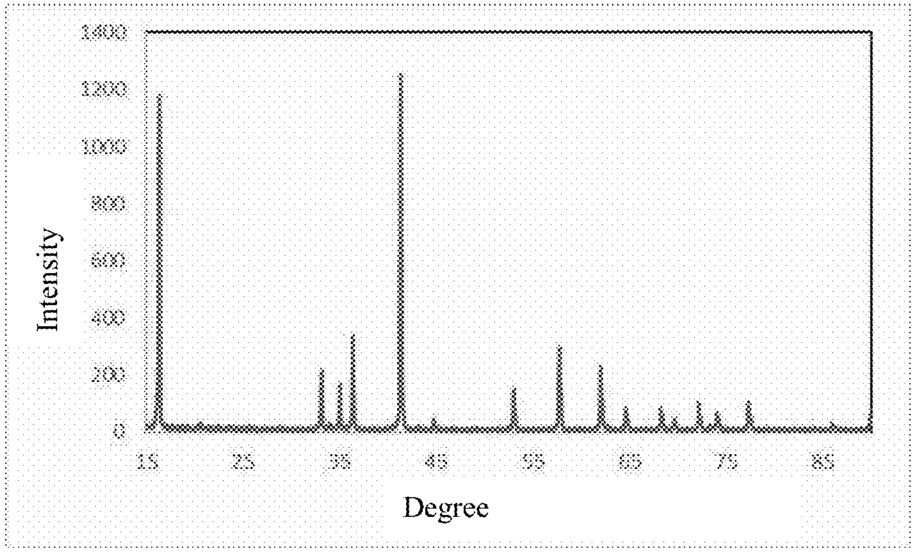
FIG. 6 is a XRD pattern of $NaNi_{0.25}Fe_{0.40}Mn_{0.25}Ti_{0.03}B_{0.05}P_{0.02}O_2$ prepared in Embodiment 2.
Figure 7:
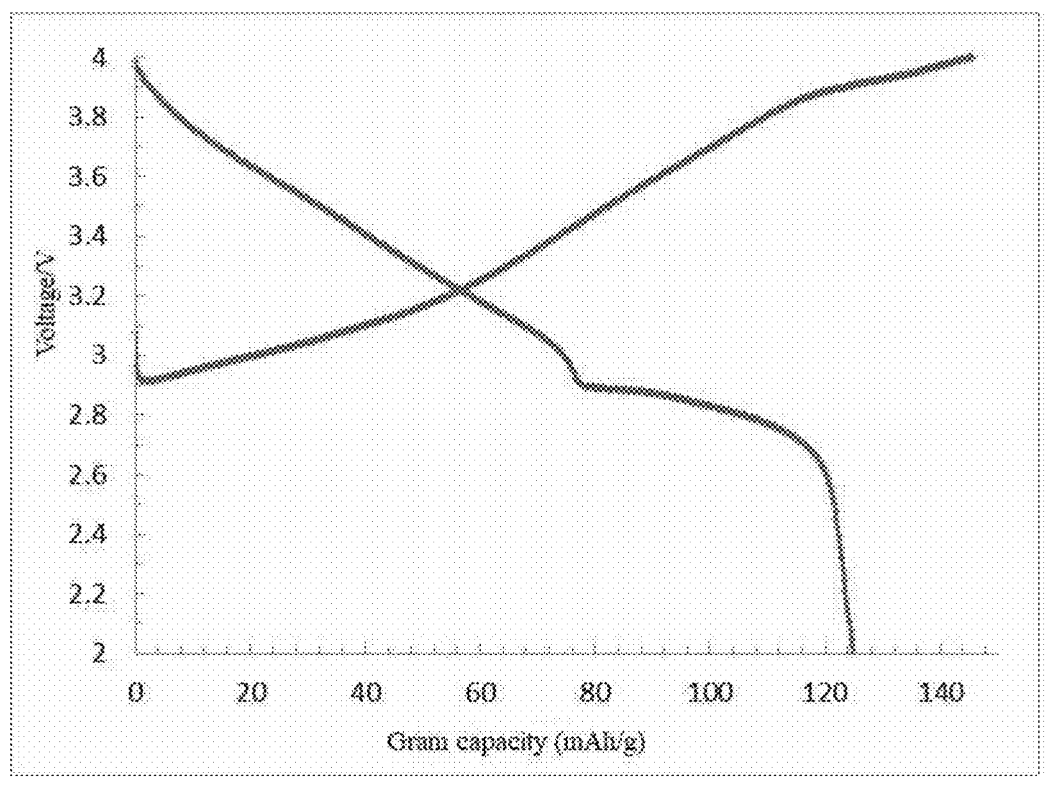
FIG. 7 is a charge-discharge curve of $NaNi_{0.25}Fe_{0.40}Mn_{0.25}Ti_{0.03}B_{0.05}P_{0.02}O_2$ prepared in Embodiment 2.
Figure 8:
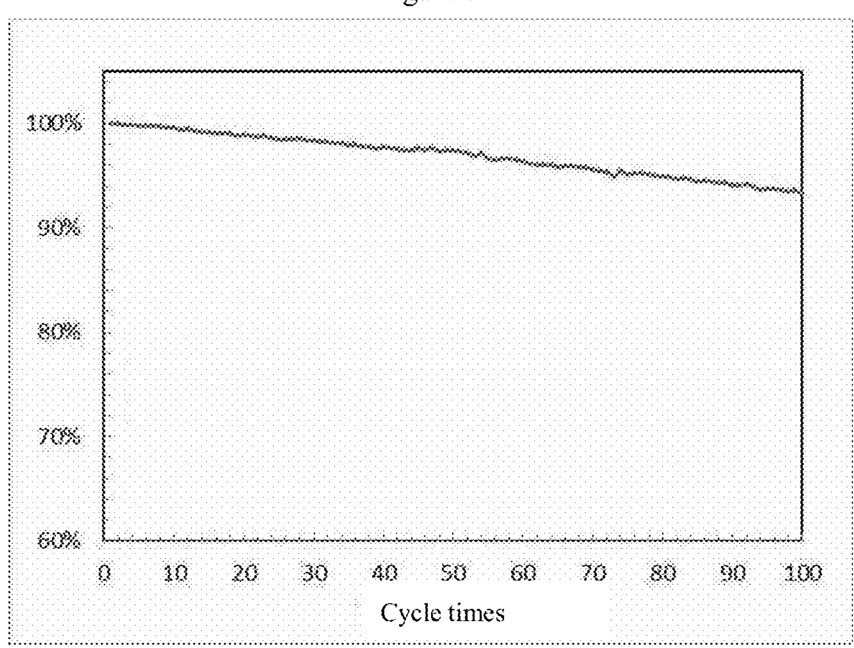
FIG. 8 is a high-temperature (60° C.) cycling diagram of $NaNi_{0.25}Fe_{0.40}Mn_{0.25}Ti_{0.03}B_{0.05}P_{0.02}O_2$ prepared in Embodiment 2 at 2.0-4.0 V/1 C.

The scanning electron microscope image of NFM242-TBP is shown in FIG. 5, and it can be seen that the material has a single crystal morphology. The XRD pattern of NFM242-TBP is shown in FIG. 6, and it can be seen that the material is α-$NaFeO_2$ type pure phase layered structure. The charge-discharge curve of NFM242-TBP is shown in FIG. 7, and it can be seen that within the voltage window of 2.0-4.0V, the specific discharge capacity at a rate of 0.1 C is 125 mAh/g. The high-temperature cycling diagram of NFM242-TBP is shown in FIG. 8, and it can be seen that at 60° C., within the voltage window of 2.0-4.0 V, the capacity retention rate is 93.31% after 100 cycles at a rate of 1 C.

Embodiment 3

The chemical formula of the cathode active material for sodium-ion batteries of this embodiment is $NaNi_{0.25}Fe_{0.4}Mn_{0.25}Ti_{0.05}P_{0.05}O_2$.

The preparation method was basically the same as that in Embodiment 1, except that step (5) was replaced by: 2.0 mol of $Ni_{0.5}Mn_{0.5}(OH)_2$, 0.8 mol of $Fe_2O_3$, 0.20 mol of $TiO_2$, 0.2 mol of $H_3PO_4$ and 2.0 mol of $Na_2CO_3$ were added into 3.5 L of water to prepare a slurry. After sand grinding, spray drying, sintering, jaw breaking, rolling, and crushing, the final obtained cathode active material for sodium-ion batteries was $NaNi_{0.25}Fe_{0.4}Mn_{0.25}Ti_{0.05}P_{0.05}O_2$, named NFM242-TP.

Embodiment 4

The chemical formula of the cathode active material for sodium-ion batteries of this embodiment is $NaNi_{0.25}Fe_{0.4}Mn_{0.25}Ca_{0.05}B_{0.05}O_2$.

The preparation method was basically the same as that in Embodiment 1, except that step (5) was replaced by: 2.0 mol of $Ni_{0.5}Mn_{0.5}(OH)_2$, 0.8 mol of $Fe_2O_3$, 0.2 mol of $CaCO_3$, 0.2 mol of $H_3BO_3$ and 2.0 mol of $Na_2CO_3$ were added into 3.5 L of water to prepare a slurry. After sand grinding, spray drying, sintering, jaw breaking, rolling, and crushing, the final obtained cathode active material for sodium-ion batteries was $NaNi_{0.25}Fe_{0.4}Mn_{0.25}Ca_{0.05}B_{0.05}O_2$, named NFM242-CaB.

Embodiment 5

The chemical formula of the cathode active material for sodium-ion batteries of this embodiment is $NaNi_{0.25}Fe_{0.4}Mn_{0.25}Ca_{0.05}P_{0.05}O_2$.

The preparation method was basically the same as that in Embodiment 1, except that step (5) was replaced by: 2.0 mol of $Ni_{0.5}Mn_{0.5}(OH)_2$, 0.8 mol of $Fe_2O_3$, 0.2 mol of $CaCO_3$, 0.2 mol of $H_3PO_4$ and 2.0 mol of $Na_2CO_3$ were added into 3.5 L of water to prepare a slurry. After sand grinding, spray drying, sintering, jaw breaking, rolling, and crushing, the final obtained cathode active material for sodium-ion batteries was $NaNi_{0.25}Fe_{0.4}Mn_{0.25}Ca_{0.05}P_{0.05}O_2$, named NFM242-CaP.

Embodiment 6

The chemical formula of the cathode active material for sodium-ion batteries of this embodiment is $NaNi_{0.25}Fe_{0.40}Mn_{0.25}Ca_{0.03}B_{0.05}P_{0.02}O_2$.

The preparation method was basically the same as that in Embodiment 1, except that step (5) was replaced by: 2.0 mol of $Ni_{0.5}Mn_{0.5}(OH)_2$, 0.8 mol of $Fe_2O_3$, 0.2 mol of $CaCO_3$, 0.2 mol of $H_3BO_3$, 0.08 mol of $H_3PO_4$ and 2.0 mol of $Na_2CO_3$ were added into 3.5 L of water to prepare a slurry. After sand grinding, spray drying, sintering, jaw breaking, rolling, and crushing, the final obtained cathode active material for sodium-ion batteries was $NaNi_{0.25}Fe_{0.40}Mn_{0.25}Ca_{0.03}B_{0.05}P_{0.02}O_2$, named NFM242-CaBP.

Comparative Example 1

It was basically the same as Embodiment 1, except that step (5) was replaced by: 2.0 mol of $Ni_{0.5}Mn_{0.5}(OH)_2$, 0.9 mol of $Fe_2O_3$, 0.2 mol of $TiO_2$ and 2.0 mol of $Na_2CO_3$ were added into 3.5 L of water to prepare a slurry. After sand grinding, spray drying, sintering, jaw breaking, rolling, and crushing, the final obtained cathode active material for sodium-ion batteries was $NaNi_{0.25}Fe_{0.45}Mn_{0.25}Ti_{0.05}O_2$, named NFM242-T.

Figure 9:
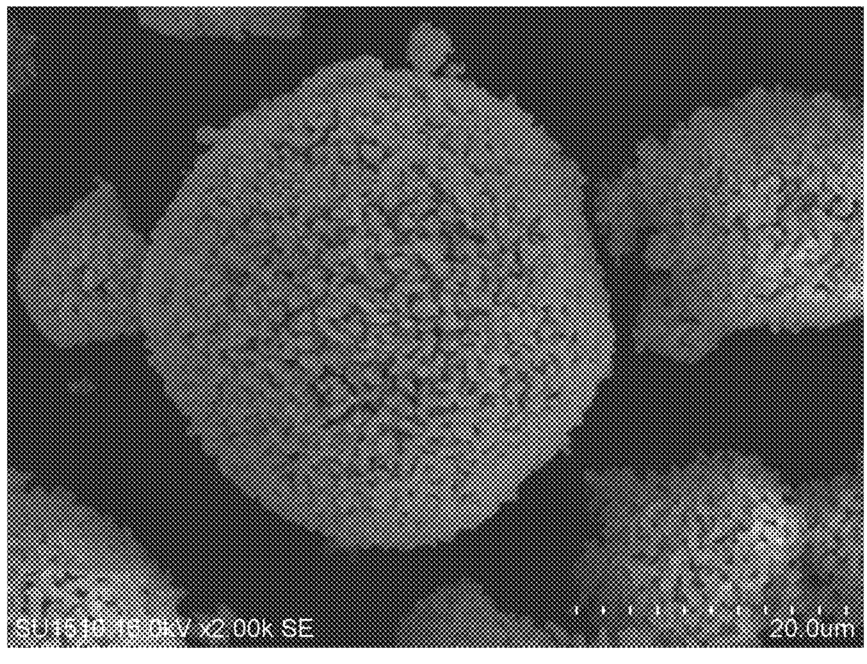
FIG. 9 is a scanning electron microscope image of $NaNi_{0.25}Fe_{0.45}Mn_{0.25}Ti_{0.05}O_2$ prepared in Comparative example 1.
Figure 10:
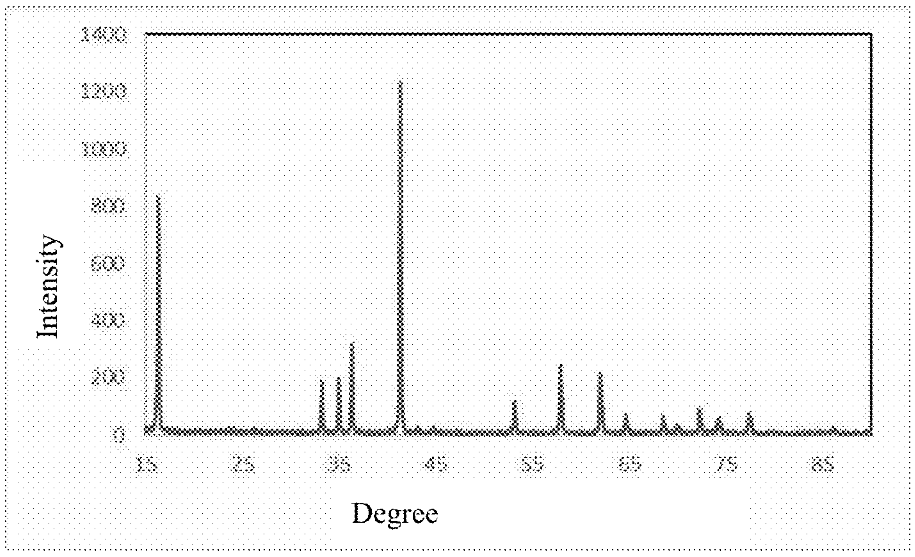
FIG. 10 is a XRD pattern of $NaNi_{0.25}Fe_{0.45}Mn_{0.25}Ti_{0.05}O_2$ prepared in Comparative example 1.
Figure 11:
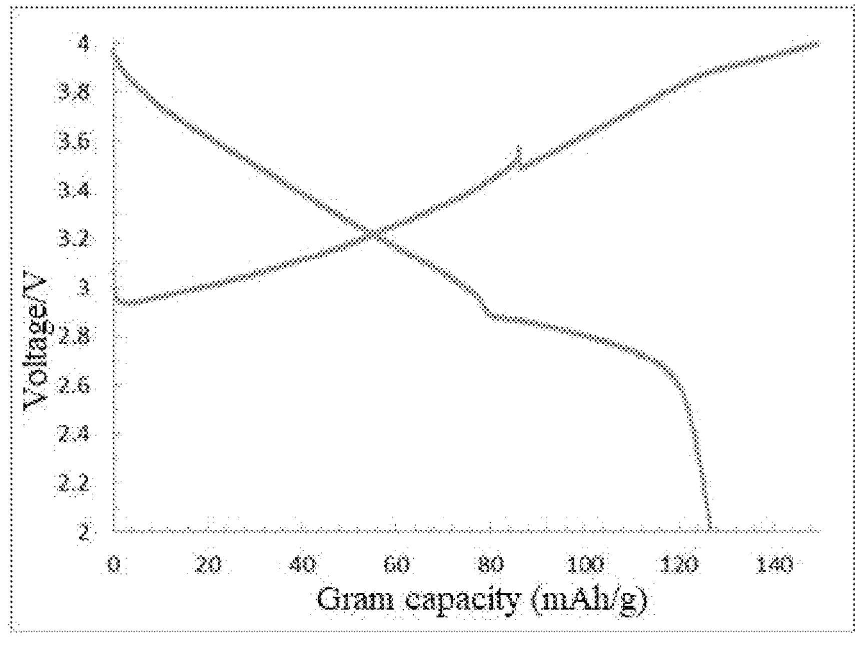
FIG. 11 is a charge-discharge curve of $NaNi_{0.25}Fe_{0.45}Mn_{0.25}Ti_{0.05}O_2$ prepared in Comparative example 1.
Figure 12:
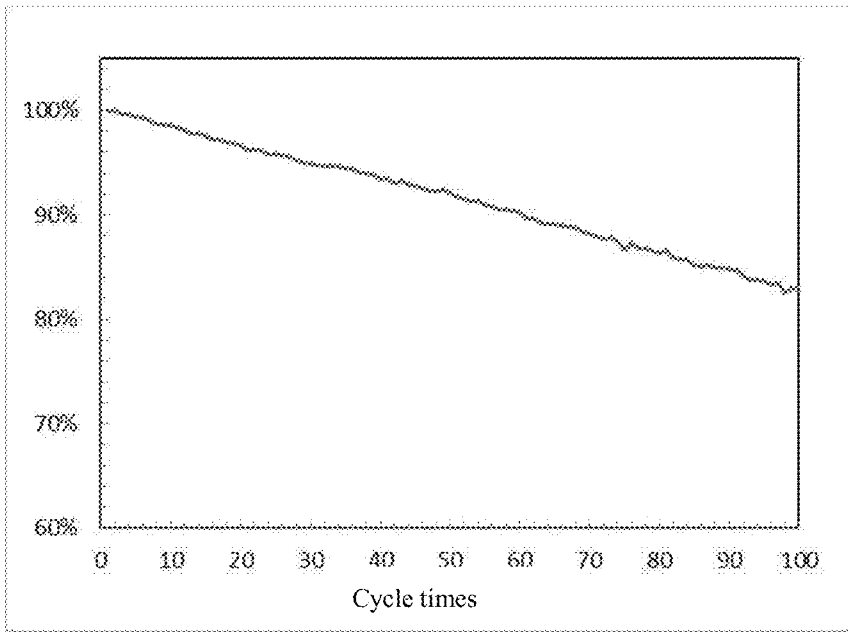
FIG. 12 is a high-temperature (60° C.) cycling diagram of $NaNi_{0.25}Fe_{0.45}Mn_{0.25}Ti_{0.05}O_2$ prepared in Comparative example 1 at 2.0-4.0 V/1 C.

The scanning electron microscope image of NFM242-T is shown in FIG. 9, and it can be seen that the material is a loose spherical structure formed by the aggregation of fine primary particles, which cannot form a single-crystal structure. The XRD pattern of NFM242-T is shown in FIG. 10, and it can be seen that the material is α-$NaFeO_2$ type pure phase layered structure. The charge-discharge curve of NFM242-T is shown in FIG. 11, and it can be seen that within the voltage window of 2.0-4.0V, the discharge gram capacity at a rate of 0.1 C is 126.6 mAh/g. The high-temperature cycling diagram of NFM242-T is shown in FIG. 12, and it can be seen that at 60° C., within the voltage window of 2.0-4.0 V, the capacity retention rate is 82.8% after 100 cycles at a rate of 1 C.

Comparative Example 2

It was basically the same as Embodiment 1, except that step (5) was replaced by: 2.0 mol of $Ni_{0.5}Mn_{0.5}(OH)_2$, 0.9 mol of $Fe_2O_3$, 0.2 mol of $CaCO_3$ and 2.0 mol of $Na_2CO_3$ were added into 3.5 L of water to prepare a slurry. After sand grinding, spray drying, sintering, jaw breaking, rolling, and crushing, the final obtained cathode active material for sodium-ion batteries was $NaNi_{0.25}Fe_{0.45}Mn_{0.25}Ca_{0.05}O_2$, named NFM242-Ca.

Comparative Example 3

It was basically the same as Embodiment 1, except that step (5) was replaced by: 2.0 mol of $Ni_{0.5}Mn_{0.5}(OH)_2$, 1.0 mol of $Fe_2O_3$ and 2.0 mol of $Na_3CO_3$ were added into 3.5 L of water to prepare a slurry. After sand grinding, spray drying, sintering, jaw breaking, rolling, and crushing, the final obtained cathode active material for sodium-ion batteries was $NaNi_{0.25}Fe_{0.50}Mn_{0.25}O_2$, named NFM252.

Performance Testing

The physicochemical properties of the cathode active materials prepared in the above Embodiments 1 to 7 and Comparative examples 1 to 3 were tested, and the pH test method was: weighing 5 g of the prepared layered oxide cathode material and dispersing it into 50 mL of deionized water, stirring in a magnetic stirrer for 5 min, then standing at 25° C. for 30 min, filtering the mixed solution, and testing the pH of the filtrate with a pH meter. The physicochemical property results are shown in Table 1.

TABLE 1

| Physicochemical properties of cathode active materials | | | | | | | |
|---|---|---|---|---|---|---|---|
| No. | Sample name | D10/ µm | D50/ µm | D90/ µm | Tap density (g/cm$^3$) | Specific surface area (m$^2$/g) | pH |
| Embodiment 1 | NFM242-TB | 2.08 | 7.72 | 17.87 | 1.98 | 0.59 | 12.25 |
| Embodiment 2 | NFM242-TBP | 3.02 | 7.24 | 18.54 | 2.06 | 0.54 | 12.07 |
| Embodiment 3 | NFM242-TP | 1.18 | 4.43 | 13.19 | 1.37 | 1.31 | 12.43 |
| Embodiment 4 | NFM242-CaB | 1.41 | 7.92 | 19.78 | 1.94 | 0.62 | 12.30 |
| Embodiment 5 | NFM242-CaP | 1.48 | 4.36 | 15.24 | 1.33 | 1.47 | 12.45 |
| Embodiment 6 | NFM242-CaBP | 2.08 | 7.04 | 20.24 | 2.01 | 0.56 | 12.19 |
| Comparative example 1 | NFM242-T | 1.70 | 3.85 | 10.42 | 1.35 | 1.55 | 12.82 |
| Comparative example 2 | NFM242-Ca | 1.20 | 4.66 | 11.92 | 1.40 | 1.53 | 12.90 |
| Comparative example 3 | NFM252 | 0.32 | 3.65 | 21.59 | 1.28 | 1.60 | 12.88 |

The performance of sodium-ion batteries used the cathode active materials prepared in the above Embodiments 1 to 7 and Comparative examples 1 to 3 was tested, and the method for preparing a sodium-ion battery was: 20 g of prepared cathode active material was weighed, 0.64 g of conductive agent SP and 0.64 g of PVDF dissolved in NMP were added, mixed evenly, and coated on aluminum foil to make an electrode plate. In a glove box in argon atmosphere, a button cell was assembled with a metal sodium sheet as the anode, Celgard2700 as the diaphragm, and 1 mol/L $NaPF_6$+EC:DEC (1:1)+5% FEC as the electrolyte. Then, the charge-discharge curve was tested at a voltage range of 2.0-4.0 V, a charge discharge rate of 0.1 C, a current of 13 mA, and a test temperature of 25±2° C., and the cycling performance was tested for 100 cycles at a voltage range of 2.0-4.0 V, a charge discharge rate of 1 C, a current of 130 mA, and 60° C. The test results are shown in Table 2 below.

TABLE 2

| Performance of sodium-ion batteries | | | | | |
|---|---|---|---|---|---|
| No. | Sample name | Initial discharge gram capacity (mAh/g) 0.1 C, 25° C. | Discharge gram capacity after 1 cycle (mAh/g) 1 C, 60° C. | Discharge gram capacity after 100 cycles (mAh/g) 1 C, 60° C. | Retention after 100 cycles (%) |
| Embodiment 1 | NFM242-TB | 124.8 | 117.6 | 104.7 | 89.04% |
| Embodiment 2 | NFM242-TBP | 125.0 | 119.8 | 111.8 | 93.31% |
| Embodiment 3 | NFM242-TP | 125.3 | 118.6 | 102.6 | 86.50% |
| Embodiment 4 | NFM242-CaB | 126.1 | 119.4 | 105.7 | 88.56% |
| Embodiment 5 | NFM242-CaP | 125.6 | 118.0 | 99.4 | 84.26% |
| Embodiment 6 | NFM242-CaBP | 125.1 | 117.4 | 108.6 | 92.47% |
| Comparative example 1 | NFM242-T | 126.6 | 120.0 | 99.3 | 82.80% |
| Comparative example 2 | NFM242-Ca | 127.3 | 120.5 | 96.7 | 80.29% |
| Comparative example 3 | NFM252 | 131.8 | 120.9 | 93.0 | 76.95% |

From Tables 1-2 above, it can be seen that by adding B and P elements to the cathode active material for sodium-ion batteries, and controlling the ratio of all elements, the present disclosure can achieve the formation of a perfect layered single-crystal structure of the cathode active material, with large single-crystal particles and dense growth, the cathode active material has a significantly increased tap density, low pH, stable surface properties, and minimal side reactions with electrolytes, and when used in sodium-ion batteries, it can significantly improve the cycling performance at high temperatures while ensuring high gram capacity.

The embodiments described above are only for illustrating the technical concepts and features of the present disclosure, and are intended to make those skilled in the art being able to understand the present disclosure and thereby implement it, and should not be concluded to limit the protective scope of this disclosure. Any equivalent variations or modifications according to the spirit of the present disclosure should be covered by the protective scope of the present

The invention claimed is:

1. A cathode active material for sodium-ion batteries, wherein, the cathode active material has a chemical formula of NaxNiyFezMngMhAmO2, wherein M is selected from the group consisting of Ti, Al, Mg, Ca, Zr, Y, Zn, Nb, W and combinations thereof, A is selected from the group consisting of B, P, C and combinations thereof, $0.80 \le x \le 1.40$, $0.05 \le y \le 0.95$, $0.05 \le z \le 0.95$, $0.05 \le g \le 0.95$, $0.01 \le h \le 0.50$, and $0.01 \le m \le 0.30$; the cathode active material has a layered single-crystal structure, with an average particle size of 1-30 microns.

2. The cathode active material for sodium-ion batteries according to claim 1, wherein, in the chemical formula NaxNiyFezMngMhAmO2, $0.90 \le x \le 1.20$, and $1.2-(y+z+g+h) \ge 0$.

3. The cathode active material for sodium-ion batteries according to claim 1, wherein, in the chemical formula NaxNiyFezMngMhAmO2, $0.95 \le x \le 1.05$, $0.1 \le y \le 0.5$, $0.1 \le z \le 0.6$, $0.1 \le g \le 0.5$, $0.01 \le h \le 0.3$, and $0.01 \le m \le 0.2$.

4. The cathode active material for sodium-ion batteries according to claim 1, wherein, in the chemical formula NaxNiyFezMngMhAmO2, $0.98 \le x \le 1.03$, $0.1 \le y \le 0.4$, $0.2 \le z \le 0.5$, $0.1 \le g \le 0.4$, $0.01 \le h \le 0.2$, and $0.01 \le m \le 0.1$.

5. The cathode active material for sodium-ion batteries according to claim 1, wherein, M is selected from the group consisting of Ti, Mg, Ca and combinations thereof, A is selected from combinations of two or three of B, P and C.

6. The cathode active material for sodium-ion batteries according to claim 1, wherein, the cathode active material has a tap density of 1.33-2.5 g/cm3, and a pH of below 12.6.

7. The cathode active material for sodium-ion batteries according to claim 1, wherein, A is combinations of three of B, P and C, and the molar ratio of B, P and C is (2-4):(0.1-1.5):(0.1-1.5).

8. The cathode active material for sodium-ion batteries according to claim 1, wherein, A is combinations of two of B and P, and the molar ratio of B and P is (2-4):(0.1-1.5).

9. A cathode material for sodium-ion batteries comprising a cathode active material, an adhesive and a conductive agent, wherein, the cathode active material comprises the cathode active material for sodium-ion batteries according to claim 1.

10. A method for preparing the cathode active material for sodium-ion batteries according to claim 1, wherein, the method comprises the following steps:

1) Reacting a nickel salt, a manganese salt, and a hydroxide in the presence of a complexing agent to form nickel-manganese hydroxide;
2) Adding water to the nickel-manganese hydroxide, an iron source, a compound containing M element, a compound containing A element, and a sodium source to make a slurry, and sand grinding to give a mixed slurry;
3) Drying and sintering the mixed slurry to give a cathode active material for sodium-ion batteries.

11. The method for preparing a cathode active material for sodium-ion batteries according to claim 10, wherein, the chemical formula of the nickel-manganese hydroxide in step 1) is NiaMnb(OH)2, where $0.05 \leq a \leq 0.95$, $0.05 \leq b \leq 0.95$, and $1-a-b \geq 0$;

and/or, in step 2), a ratio of the total molar amount of nickel and manganese in the nickel-manganese hydroxide, iron in the iron source, M element in the compound containing M element and A element in the compound containing A element to the molar amount of sodium in the sodium source is 1:(0.90-1.20).

12. The method for preparing a cathode active material for sodium-ion batteries according to claim 10, wherein, in step 1), the nickel salt is selected from the group consisting of nickel sulfate, nickel chloride, nickel nitrate and combinations thereof, the manganese salt is selected from the group consisting of manganese sulfate, manganese chloride, and manganese nitrate and combinations thereof, the hydroxide is selected from the group consisting of sodium hydroxide, potassium hydroxide and combinations thereof, and the complexing agent is selected from the group consisting of ethylenediamine, ethylenediamine tetraacetic acid, tartaric acid, citric acid, oxalic acid, ammonia and combinations thereof;

and/or, in step 2), the iron source is selected from the group consisting of ferrous oxide, ferric oxide, ferroferric oxide and combinations thereof; the sodium source is selected from the group consisting of sodium carbonate, sodium hydroxide and combinations thereof.

13. The method for preparing a cathode active material for sodium-ion batteries according to claim 10, wherein, in step 1), the nickel salt and the manganese salt are prepared into a metal salt solution, which is then mixed with an aqueous solution of the hydroxide and the complexing agent to obtain a mixed solution, and the mixed solution is then reacted at pH 9-12 and 40-70° C. and stirring to give the nickel-manganese hydroxide.

14. The method for preparing a cathode active material for sodium-ion batteries according to claim 13, wherein, the total concentration of nickel and manganese ions in the metal salt solution is 0.5-2 mol/L.

15. The method for preparing a cathode active material for sodium-ion batteries according to claim 10, wherein, in step 2), the compound containing M element is selected from the group consisting of titanium dioxide, aluminum oxide, magnesium oxide, calcium oxide, calcium carbonate, zirconia, yttrium oxide, zinc oxide, niobium oxide, tungsten oxide and combinations thereof; the compound containing A element is selected from the group consisting of boric acid, boron oxide, sodium tetraborate, phosphorus pentoxide, phosphoric acid, sodium phosphate, sodium hypophosphite, glucose, sucrose, polyethylene glycol, polyvinyl alcohol and combinations thereof.

16. The method for preparing a cathode active material for sodium-ion batteries according to claim 10, wherein, in step 2), the sand grinding time is 0.5-8 h, the grinding body is zirconia balls with particle sizes of 0.1-0.8 mm, and the sand grinding speed is 800-3000 rpm.

17. The method for preparing a cathode active material for sodium-ion batteries according to claim 10, wherein, the median particle size of the particles in the mixed slurry is 20-800 nm, and the solid content of the mixed slurry is 10%-60%.

18. The method for preparing a cathode active material for sodium-ion batteries according to claim 10, wherein, in step 3), the drying is spray drying, and in the spray drying equipment, the rotational speed of the atomizing disc is 1000-3000 rpm, the inlet air temperature is 150-300° C., and the outlet air temperature is 80-120° C.

19. The method for preparing a cathode active material for sodium-ion batteries according to claim 10, wherein, in step 3), the sintering is carried out in air, with a sintering temperature of 750-1000° C. and a sintering time of 5-25 h.

* * * * *